Feb. 2, 1960 S. T. MEYERS 2,923,839

SHIFT REGISTER INTERSTAGE COUPLING CIRCUITRY

Filed Jan. 7, 1958

INVENTOR
S. T. MEYERS
BY R. B. Ardis
ATTORNEY

United States Patent Office 2,923,839

Patented Feb. 2, 1960

2,923,839

SHIFT REGISTER INTERSTAGE COUPLING CIRCUITRY

Stanley T. Meyers, East Orange, N.J., assignor to Bell Telephone Laboratories, Incorporated, New York, N.Y., a corporation of New York Application January 7, 1958, Serial No. 707,647

2 Claims. (Cl. 307—88.5)

This invention relates generally to shift registers and more particularly, although in its broader aspects not exclusively, to interstage coupling circuits for transistor shift registers.

One object of the invention is to simplify the interstage coupling circuitry used in shift registers.

Another and more particular object is to reduce the number of components required for interstage coupling circuits in transistor shift registers.

Still another object is to avoid any necessity for the use of vacuum tubes or transistors in shift register interstage coupling circuits.

In one of its most general forms, a shift register is a storage or memory device for multidigit binary numbers capable of receiving or yielding up stored numbers in either serial or parallel form. It is typically made up of a plurality of binary storage cells equal in number to the maximum number of digits to be stored and corresponding interstage coupling circuits for shifting states progressively from one binary storage cell to the next in response to an externally generated shift pulse applied simultaneously to all interstage circuits. In the past, many of the shift register interstage coupling circuits used have tended to be quite complex and to require the use of such active gain producing elements as vacuum tubes and transistors, as well as a relatively large number of other circuit elements.

In accordance with a principal feature of the present invention, the interstage coupling circuitry of a shift register made up of a plurality of symmetrical binary storage cells is considerably simplified. Broadly, states are shifted progressively from one binary cell to the next by biasing the stage or half of each cell corresponding to the non-conducting portion of the immediately preceding cell more heavily toward its non-conducting condition than the stage corresponding to the conducting portion in response to each shift pulse and removing any resulting biases from both stages substantially simultaneously upon termination of each shift pulse. In each binary cell, the less heavily biased of the two portions either becomes conducting first or continues to conduct and the more heavily biased portion remains in the non-conducting condition.

In a number of important embodiments of the invention, the symmetrical binary storage cells take the form of two-stage bistable transistor multivibrators and the interstage coupling circuit between each successive pair of multivibrators includes a storage capacitor connected from the collector circuit of the output transistor of the first multivibrator to the base of the output transistor of the second, a pair of oppositely poled and normally reverse biased diodes connected in series between the collector circuit of the output transistor of the first multivibrator and the base of the other transistor of the second, and circuitry for applying a shift pulse to the diodes to oppose their normal reverse biases momentarily and bias at least one transistor of the second multivibrator toward its non-conducting condition. The first transistor of each multivibrator is given substantially the same bias toward its non-conducting condition regardless of the state of the preceding multivibrator. The second or output transistor is given either a larger or a smaller (including zero) bias during the shift pulse, depending upon whether the output transistor of the preceding multivibrator is non-conducting or conducting immediately prior to the shift pulse. For either state of the preceding multivibrator, the interstage coupling circuitry featured by the invention thus provides a difference between the biases on the two transistors, with the one corresponding to the non-conducting stage of the preceding multivibrator receiving the heavier bias toward its non-conducting condition. In this manner, states are shifted progressively from one binary storage cell to the next with a minimum number of interstage coupling elements and without any necessity for using either vacuum tubes or transistors in the interstage coupling circuits.

A more complete understanding of the invention may be obtained from a study of the following detailed description of several specific embodiments. In the drawings.

Figure 1:
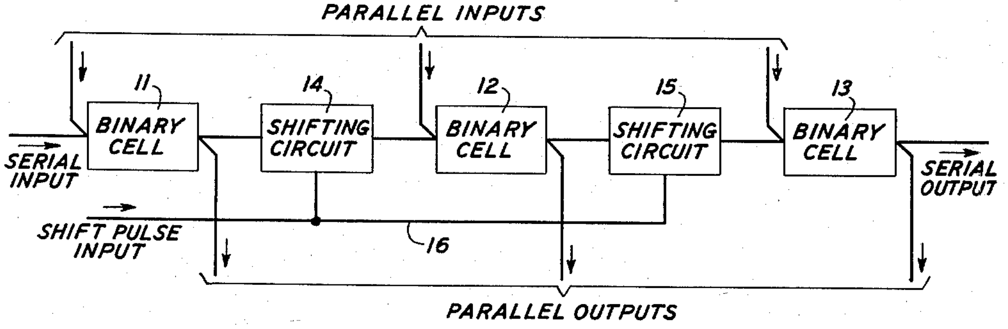
Fig. 1 is a block diagram of a generalized three-stage shift register.

The typical shift register in Fig. 1 is shown, by way of example, as comprising three serially connected binary storage cells 11, 12, and 13 separated by two interstage coupling or shifting circuits 14 and 15. A shift pulse input line 16 is connected to supply periodic shift pulses simultaneously to both shifting circuits. The shift register shown is capable of storing three-digit binary numbers. As illustrated, such numbers may be applied to the register in either serial or parallel form and, similarly, may be delivered in either serial or parallel form.

The operation of a shift register is best understood with the aid of an example. If the output portions or stages of all three binary cells in Fig. 1 are initially in their conducting conditions (i.e., the circuit initially registers the binary number 000), the shift register is ready to receive a number for storage. Suppose, for example, that the binary number to be stored is 110. If the number is already available in parallel form (i.e., with one digit available on each of three separate leads), it may, of course, be registered directly on the three binary cells. Since the most significant digit is normally registered on the right, the output stages of binary storage cells 11, 12, and 13 would then be in their conducting, non-conducting, and non-conducting conditions, respectively. If, however, the number to be stored is available only in serial form, it must be registered one digit at a time and all digits shifted one place to the right after each new registration in order to make room for the next.

When the binary number 110 is applied in serial form to the shift register illustrated in Fig. 1, the most significant digit, a 1, is first registered on binary cell 11, the output stage of which is thereby shifted to its non-conducting condition. A shift pulse on shift line 16 transfers the state of binary cell 11 to binary cell 12, the output stage of which then becomes non-conducting. Binary cell 11 is then ready to receive the next most significant digit, also a 1. Before each digit is registered on binary cell 11 in this manner, all digits already registered are shifted one place to the right.

The shift register may be made to yield up its stored number in much the same manner that it was registered. The stored number can be read directly in parallel form simply by noting the condition of the output stage of each binary storage cell. If the output is required to be in serial form, the application of a succession of shift pulses to shift line 16 causes the number to appear, one digit at a time in decreasing order of significance, on the output side of right-hand binary cell 13.

Figure 2:
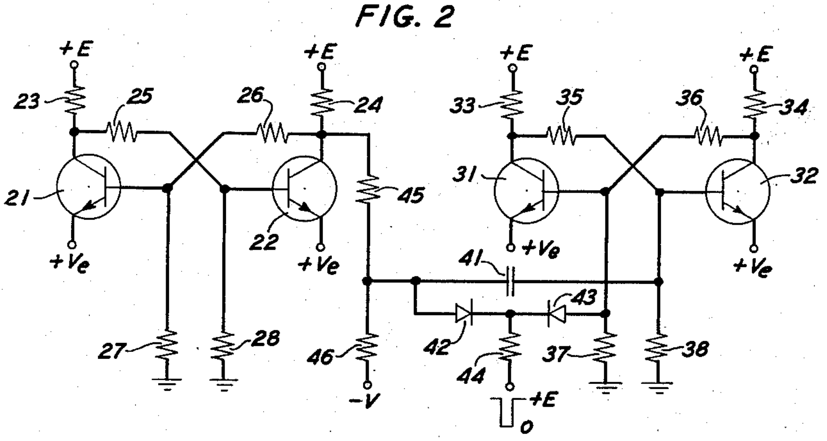
Fig. 2 is a schematic diagram of one important transistor shift register interstage coupling circuit featured by the invention.

One form of the simplified interstage coupling or shifting circuit featured by the present invention is illustrated in detail in Fig. 2. The two binary cells shown are of the symmetrical two-stage bistable transistor multivibrator type. The first binary cell contains a pair of junction transistors 21 and 22 of like conductivity type, the one to the right constituting the output stage. The emitter electrodes of both transistors 21 and 22 are connected directly to a positive source of direct potential $V_e$, while the collector electrodes are connected through respective dropping resistors 23 and 24 to a positive source of direct collector potential E. Of these two direct potentials, E is the larger. The collector electrode of each transistor is cross-coupled to the base electrode of the other through a respective one of a pair of coupling resistors 25 and 26. The base electrode of transistor 21 is returned to ground potential through a biasing resistor 27, while that of output transistor 22 is returned to the same potential through a similar biasing resistor 28. The second of the two binary cells in Fig. 2 is the same as the first, being made up of a pair of like junction transistors 31 and 32, a pair of collector dropping resistors 33 and 34, a pair of cross-coupling resistors 35 and 36, and a pair of base biasing resistors 37 and 38. Like transistor 22 in the first binary cell, transistor 32 is the output stage.

The interstage coupling circuit shown in Fig. 2 consists, primarily, of only four passive circuit elements: a storage capacitor 41, a pair of oppositely poled diodes 42 and 43, and a resistor 44. Two resistors 45 and 46 are connected in series between the collector electrode of first stage output transistor 22 and a source of negative direct potential V to provide a potential displacement toward the negative for proper operation of the coupling circuit. Storage capacitor 41 is connected from the junction of resistors 45 and 46 to the base electrode of second stage output transistor 32, while oppositely poled diodes 42 and 43 are connected in series between the same junction and the base electrode of the other transistor 31. Resistor 44 is connected from the junction between diodes 42 and 43 to the shift pulse line.

In operation, one transistor of each of the bistable multivibrators illustrated in Fig. 2 is conducting and the other is non-conducting, the order depending upon the binary number stored in the shift register at the time. In the left-hand multivibrator, output transistor 22 is non-conducting when a 1 is stored but conducting when a 0 is stored. The same is true for output transistor 32 in the right-hand circuit. Thus, when a 0 is stored in the left-hand binary cell, the output potential to ground at the collector electrode of output transistor 22 is substantially $V_e$, since the internal collector-emitter resistance of the transistor is negligible. When a 1 is stored, however, the output potential at the same point rises to a value which may be denoted by the symbol $V_p$ and is determined by the potential E and the dividing action of resistors 24 and 26. Whichever its magnitude, this output potential is applied to the interstage coupling circuit featured by the invention through the potential divider formed by resistors 45 and 46, giving a potential to ground at the junction which is positive when transistor 22 is non-conducting and negative when transistor 22 is conducting.

When the left-hand transistor multivibrator in Fig. 2 has stored a 1, the voltage at the junction of resistors 45 and 46 is greater than $V_e$, causing a charge to be placed on storage capacitor 41 with the positive side facing resistors 45 and 46. During the time between shift pulses, resistor 44 is returned to the potential E, causing a back bias to be maintained on diodes 42 and 43. During a shift pulse, however, the shift line goes from the positive potential E to ground potential, forward biasing both diodes and biasing both transistors 31 and 32 in the right-hand multivibrator toward their non-conducting conditions. Transistor 31 is back biased by the voltage $V_e$ on the emitter. Output transistor 32, however, is back biased by $V_e$ plus the charge on storage capacitor 41. Since output transistor 32 receives the heavier bias, it remains in its non-conducting condition longer than transistor 31 upon termination of the shift pulse. Transistor 31 starts to conduct first as the voltage on resistor 44 returns to E, and output transistor 32 remains in its non-conducting condition. The 1 originally registered on the left-hand multivibrator is thus transferred to the right-hand circuit, where it remains until the next shift pulse arrives.

When the left-hand multivibrator in Fig. 2 has stored a 0, voltage at the junction of resistors 45 and 46 is negative. During the interval between shift pulses, the potential E on resistor 44 maintains a back bias on both diodes 42 and 43. During a shift pulse, ground potential on resistor 44 forward biases diode 43 but leaves diode 42 in the back biased condition. After a 0 has been stored in the left-hand multivibrator, therefore, the emitter-base bias on output transistor 32 is not changed by the shift pulse. Transistor 31, on the other hand, is biased heavily toward its non-conducting condition during the shift pulse just as if a 1 had been stored, forcing output transistor 32 into its conducting condition. After termination of the shift pulse, transistors 31 and 32 remain non-conducting and conducting, respectively, thus registering on the output stage of the second multivibrator the 0 originally registered on the first.

As can readily be seen from the description of the mode of operation of the embodiment of the invention illustrated in Fig. 2, the present invention permits the employment of as few as four passive circuit elements plus a voltage divider to shift states progressively from one binary storage cell of a shift register to the next. Furthermore, it eliminates all necessity for the use of either vacuum tubes or transistors in the interstage coupling circuitry of a shift register.

Figure 3:
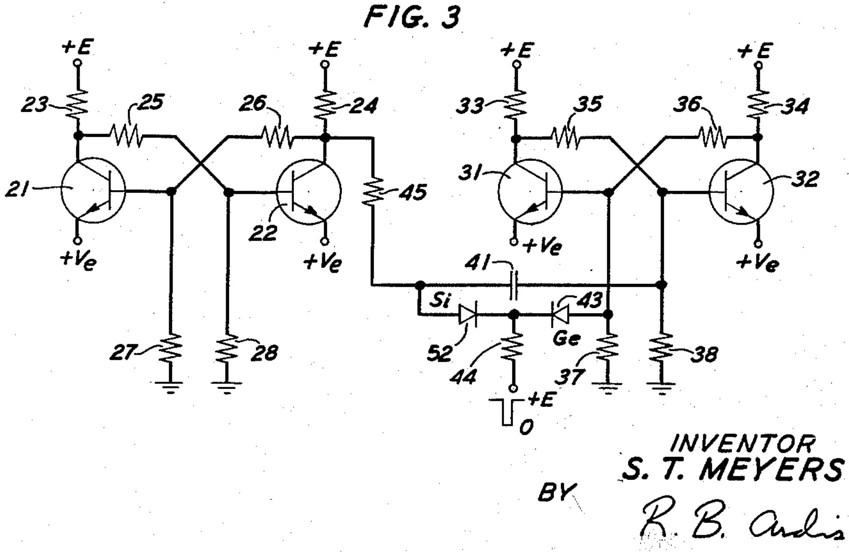
Fig. 3 is a schematic diagram of an alternative to the interstage coupling circuit illustrated in Fig. 2.

The alternative shift register interstage coupling circuit illustrated in Fig. 3 is identical in most respects to the coupling circuit shown in Fig. 2 except for some circuit simplifications. Principally, these circuit simplifications consist of the elimination of the voltage divider which displaces the output waveform of the first multivibrator to the negative. Thus both resistor 46 and the source of negative potential V are eliminated from the embodiment of the invention shown in Fig. 3, simplifying the interstage circuitry still further. In addition, diode 42 is replaced by a like-connected and similarly poled diode 52 which has the low impedance portion of its forward conducting characteristic offset from the zero voltage axis. For a silicon diode, the amount of this displacement voltage is of the order of 0.4 volt. Diode 52, in other words, does not conduct in a forward direction until the voltage across it exceeds approximately 0.4 volt. When a silicon diode is used as diode 52, diode 43 is preferably a germanium diode, which has the low impedance portion of its forward conducting characteristic offset from the zero voltage axis by a much smaller amount.

Operation of the alternative embodiment of the invention illustrated in Fig. 3 is substantially the same as that of the embodiment shown in Fig. 2. Instead of shifting between positive and negative potentials to represent the registration of a 1 or a 0 on the left-hand multivibrator, however, the junction point between resistor 45 and storage capacitor 41 shifts between the voltages $V_p$ and $V_e$. When the left-hand multivibrator has stored a 1, the voltage $V_p$ at the lower end of resistor 45 causes a charge to be placed on storage capacitor 41 with the positive side facing resistor 45. Between shift pulses, a positive potential E, which is greater than either $V_e$ or $V_p$, maintains a back bias on both diodes 43 and 52. During a shift pulse, ground potential on resistor 44 forward biases both diodes 43 and 52 and biases both transistors 31 and 32 toward their non-conducting conditions, with output transistor 32 receiving the heavier bias due to the charge on storage capacitor 41. Transistor 31 starts to conduct first on termination of the shift pulse, forcing output transistor 32 to remain in its non-conducting condition. The 1 originally registered on the left-hand multivibrator is thus transferred to the right-hand circuit.

When the left-hand multivibrator in Fig. 3 has stored a 0, both diodes 43 and 52 remain back biased by the voltage E at least until the arrival of a shift pulse. The germanium diode 43 is forward biased as soon as the lower end of resistor 44 goes to ground potential, but the voltage $V_e$ at the lower end of resistor 45 may not be sufficient to forward bias silicon diode 52. Diode 52 retains its reverse bias if $V_e$ is less than its displacement voltage, and the bias on output transistor 32 remains unchanged during the shift pulse. If $V_e$ is greater than the displacement voltage of diode 52, diode 52 is forward biased during the shift pulse and output transistor 32 is biased toward its non-conducting condition but to a lesser degree than transistor 31. The bias difference thus forces out transistor 32 into or leaves it in its conducting condition, where it remains after termination of the shift pulse.

An alternative to the use of silicon diode 52 in the embodiment of the invention shown in Fig. 3, particularly if greater differences are desired between the biases supplied to the two sides of the right-hand multivibrator, is an avalanche breakdown diode poled in the opposite direction and having a breakdown voltage less than $V_p$. $V_p$ is thus large enough to make the diode conduct during transfer of a 1. Still another alternative is the use of two germanium diodes as diodes 43 and 52 but with a direct voltage source connected in series with diode 52 to back bias it by an amount greater than $V_e$ but less than $V_p$. Operation is then substantially as described in connection with Fig. 3.

It is to be understood that the above-described arrangements are illustrative of the application of the principles of the invention. Numerous other arrangements may be devised by those skilled in the art without departing from the spirit and scope of the invention.

What is claimed is:

1. In a shift register, first and second bistable multivibrators each comprising a pair of cross-coupled transistors having emitter, collector, and base electrodes, and means to shift states progressively from said first to said second multivibrator which comprises a pair of oppositely poled diodes connected in series between the collector electrode of one transistor of said first multivibrator and the base electrode of one transistor of said second multivibrator, a storage capacitor connected between the collector electrode of said transistor of said first multivibrator and the base electrode of the other transistor of said second multivibrator, means to bias both of said diodes in the reverse direction, and means to supply a shift pulse to the junction between said diodes to oppose said bias and bias at least one of the transistors of said second multivibrator toward its non-conducting condition, whereby the charge stored on said storage capacitor from said first multivibrator provides a difference between the biases on the transistors of said second multivibrator and insures that the state of said second multivibrator following said shift pulse corresponds to the state of said first multivibrator prior to said shift pulse.

2. In a shift register, first and second bistable multivibrators each comprising a pair of cross-coupled transistors having emitter, collector, and base electrodes, and means to shift states progressively from said first to said second multivibrator which comprises a storage capacitor connected between the collector electrode of the output transistor of said first multivibrator and the base electrode of the output transistor of said second multivibrator, a pair of oppositely poled diodes connected in series between the collector electrode of the output transistor of said first multivibrator and the base electrode of the other transistor of said second multivibrator, means to bias both of the said diodes in the reverse direction, and means to supply a shift pulse to the junction between said diodes to oppose said bias and bias at least one of the transistors of said second multivibrator toward its non-conducting condition, whereby the charge stored on said storage capacitor from said first multivibrator provides a difference between the biases on the transistors of said second multivibrator and insures that the state of said second multivibrator following said shift pulse corresponds to the state of said first multivibrator prior to said shift pulse.

References Cited in the file of this patent

UNITED STATES PATENTS

| | | |
|---|---|---|
| 2,601,089 | Burkhart | June 17, 1952 |
| 2,785,304 | Bruce et al. | Mar. 12, 1957 |